United States Patent
Wang

(10) Patent No.: US 10,928,664 B2
(45) Date of Patent: Feb. 23, 2021

(54) DISPLAY SUBSTRATE, METHOD FOR MANUFACTURING THE SAME AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Liang Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 47 days.

(21) Appl. No.: 15/525,919

(22) PCT Filed: Aug. 22, 2016

(86) PCT No.: PCT/CN2016/096184
§ 371 (c)(1),
(2) Date: May 10, 2017

(87) PCT Pub. No.: WO2017/128705
PCT Pub. Date: Aug. 3, 2017

(65) Prior Publication Data
US 2018/0081218 A1  Mar. 22, 2018

(30) Foreign Application Priority Data
Jan. 26, 2016 (CN) .......................... 201610050222.3

(51) Int. Cl.
*G02F 1/1333* (2006.01)
*G06F 3/044* (2006.01)
(Continued)

(52) U.S. Cl.
CPC .... *G02F 1/13338* (2013.01); *G02F 1/133512* (2013.01); *G02F 1/133514* (2013.01);
(Continued)

(58) Field of Classification Search
CPC ........... G02F 1/13338; G02F 1/133512; G02F 1/133514; G02F 1/133516; G02F 1/13394;
(Continued)

(56) References Cited

U.S. PATENT DOCUMENTS 5,463,481 A * 10/1995 Yamamura .......... G02F 1/13476
349/74
5,815,232 A * 9/1998 Miyazaki ............ G02F 1/13394
349/155

(Continued)

FOREIGN PATENT DOCUMENTS

CN 103309536 A 9/2013
CN 104123053 A 10/2014
(Continued)

OTHER PUBLICATIONS

"First office action," CN Application No. 201610050222.3 (dated Apr. 2, 2018).
(Continued)

*Primary Examiner* — Michael J Jansen, II
(74) *Attorney, Agent, or Firm* — Womble Bond Dickinson (US) LLP

(57) ABSTRACT

A display substrate, a method for manufacturing the same and a display device are disclosed. The display substrate comprises: a base substrate; a patterned black matrix arranged on the base substrate; and touch electrodes, wherein in a region where the black matrix is located, the display substrate comprises a filter layer stack located on the black matrix, the filter layer stack comprising two or more
(Continued)

color filter layers stacked sequentially and a plurality of openings provided therein; and the touch electrodes are arranged on the filter layer stack and cover surfaces of the plurality of openings. According to the present disclosure, a surface area of the touch electrodes is increased, which facilitates accumulation of more charges and thus improves the sensitivity and accuracy of the touch control.

17 Claims, 4 Drawing Sheets

(51) Int. Cl.
 G02F 1/1335 (2006.01)
 G06F 3/041 (2006.01)
 G02F 1/1362 (2006.01)
 G02F 1/1339 (2006.01)
(52) U.S. Cl.
 CPC ........ *G02F 1/133516* (2013.01); *G06F 3/044* (2013.01); *G06F 3/0412* (2013.01); *G02F 1/13394* (2013.01); *G02F 2001/133519* (2013.01); *G02F 2001/136222* (2013.01); *G06F 3/0443* (2019.05); *G06F 2203/04103* (2013.01)
(58) Field of Classification Search
 CPC ........ G02F 2001/133519; G02F 2001/136222; G02F 1/134309; G06F 2203/04103; G06F 3/0412; G06F 3/044; G06F 3/0443
 See application file for complete search history.

(56) References Cited

U.S. PATENT DOCUMENTS

| | | | | |
|---|---|---|---|---|
| 7,470,491 B2 * | 12/2008 | Lee | ........................ | G02B 5/201 430/321 |
| 7,570,323 B2 * | 8/2009 | Yagi | .................. | G02F 1/133514 349/106 |
| 8,054,297 B2 * | 11/2011 | Huang | .................. | G06F 3/0412 345/173 |
| 8,179,482 B2 * | 5/2012 | Hur | ........................ | G06F 3/0412 345/104 |
| 8,193,018 B2 * | 6/2012 | Cok | .................... | H01L 27/3211 257/390 |
| 9,019,459 B2 * | 4/2015 | Okumoto | .......... | G02F 1/133514 349/106 |
| 9,130,181 B2 * | 9/2015 | Choi | .................... | H01L 51/5284 |
| 9,164,306 B2 * | 10/2015 | Lee | ........................ | G06F 3/041 |
| 9,214,501 B2 * | 12/2015 | Lee | ........................ | G06F 3/0412 |
| 9,348,170 B2 * | 5/2016 | Wang | ................ | G02F 1/133514 |
| 9,405,330 B2 * | 8/2016 | Yamagishi | .............. | G06F 3/044 |
| 9,448,654 B2 * | 9/2016 | Liu | ........................... | G06F 1/16 |
| 9,571,097 B2 * | 2/2017 | Wang | ................ | H03K 17/9622 |
| 9,639,211 B2 * | 5/2017 | Kurokawa | ........... | G06F 3/0412 |
| 9,823,789 B2 * | 11/2017 | Ding | ........................ | G06F 3/044 |
| 9,977,272 B2 * | 5/2018 | Lee | ..................... | G02F 1/13338 |
| 10,013,121 B2 * | 7/2018 | Wang | .................... | G06F 3/0412 |
| 10,018,869 B2 * | 7/2018 | Lee | ........................ | G06F 3/044 |
| 10,095,362 B2 * | 10/2018 | Hirakata | ................. | G06F 3/044 |
| 10,203,411 B2 * | 2/2019 | Jones | .................... | G01S 17/026 |
| 10,317,587 B2 * | 6/2019 | Ma | ......................... | G02B 5/201 |
| 10,394,014 B2 * | 8/2019 | Sakai | .................. | G02B 26/005 |
| 10,558,091 B2 * | 2/2020 | Yamamoto | ........ | G02F 1/133514 |
| 10,656,740 B2 * | 5/2020 | Noguchi | ........... | G02F 1/136286 |
| 10,802,347 B2 * | 10/2020 | Nagasawa | ............ | G02F 1/1368 |
| 2005/0095514 A1 * | 5/2005 | Lee | ........................ | G02B 5/201 430/7 |
| 2005/0151909 A1 * | 7/2005 | Yagi | .................. | G02F 1/133514 349/138 |
| 2006/0250534 A1 * | 11/2006 | Kutscher | ............ | G02F 1/13338 349/41 |
| 2009/0179210 A1 * | 7/2009 | Cok | .................... | H01L 27/3211 257/98 |
| 2009/0237369 A1 * | 9/2009 | Hur | ........................ | G06F 3/0412 345/173 |
| 2010/0103119 A1 * | 4/2010 | Huang | .................. | G06F 3/0412 345/173 |
| 2012/0105337 A1 * | 5/2012 | Jun | ........................ | G06F 3/0412 345/173 |
| 2013/0003008 A1 * | 1/2013 | Okumoto | .......... | G02F 1/133514 349/155 |
| 2014/0061597 A1 * | 3/2014 | Choi | .................... | H01L 51/5284 257/40 |
| 2014/0078414 A1 * | 3/2014 | Lee | ........................ | G06F 3/041 349/12 |
| 2014/0118419 A1 * | 5/2014 | Wu | ........................ | G06F 3/0412 345/690 |
| 2014/0124797 A1 * | 5/2014 | Jones | .................... | G01S 17/026 257/80 |
| 2014/0160377 A1 * | 6/2014 | Yamagishi | .............. | G06F 3/044 349/12 |
| 2014/0346493 A1 * | 11/2014 | Lee | ........................ | G06F 3/0412 257/40 |
| 2014/0375911 A1 * | 12/2014 | Lee | ..................... | G02F 1/13338 349/12 |
| 2015/0054803 A1 * | 2/2015 | Yashiro | .................. | G06F 3/041 345/206 |
| 2015/0060252 A1 * | 3/2015 | Wang | ................ | H03K 17/9622 200/5 R |
| 2015/0253912 A1 * | 9/2015 | Liu | ........................... | G06F 1/16 345/174 |
| 2015/0331529 A1 * | 11/2015 | Lee | ........................ | G06F 3/044 345/174 |
| 2015/0362774 A1 * | 12/2015 | Ide | ..................... | G02F 1/13338 349/12 |
| 2016/0018922 A1 * | 1/2016 | Wang | .................... | G06F 3/0412 345/174 |
| 2016/0098113 A1 * | 4/2016 | Ding | ........................ | G06F 3/044 345/174 |
| 2016/0103360 A1 * | 4/2016 | Wang | ................ | G02F 1/133514 349/12 |
| 2016/0266721 A1 * | 9/2016 | Kurokawa | ........... | G06F 3/0412 |
| 2016/0282989 A1 * | 9/2016 | Hirakata | ................. | G06F 3/044 |
| 2017/0205926 A1 * | 7/2017 | Noguchi | ........... | G02F 1/133305 |
| 2017/0219748 A1 * | 8/2017 | Ma | ......................... | G02B 5/201 |
| 2017/0276928 A1 * | 9/2017 | Sakai | .................. | G02B 5/201 |
| 2018/0081218 A1 * | 3/2018 | Wang | .................... | G06F 3/044 |
| 2018/0088405 A1 * | 3/2018 | Nagasawa | ......... | G02F 1/133512 |
| 2019/0310505 A1 * | 10/2019 | Yamamoto | ........ | G02F 1/133514 |

FOREIGN PATENT DOCUMENTS

| | | |
|---|---|---|
| CN | 104267531 | 1/2015 |
| CN | 104267531 A | 1/2015 |
| CN | 105629548 A | 6/2016 |

OTHER PUBLICATIONS

International Search Report and Written Opinion in PCT/CN2016/096184 dated Nov. 28, 2016, with English translation.

* cited by examiner

DISPLAY SUBSTRATE, METHOD FOR MANUFACTURING THE SAME AND DISPLAY DEVICE

RELATED APPLICATIONS

The present application is the U.S. national phase entry of PCT/CN2016/096184, with an international filing date of Aug. 22, 2016, which claims the benefit of Chinese Patent Application No. 201610050222.3, filed on Jan. 26, 2016, the entire disclosures of which are incorporated herein by reference.

TECHNICAL FIELD

The present disclosure relates to the field of display technologies, and in particular to a display substrate, a method for manufacturing the same and a display device.

BACKGROUND

Nowadays, intelligent devices generally realize human-machine interactions by using touch technologies. Touch panels can be divided into add-on touch panels, on-cell touch panels and in-cell touch panels, depending on composition and structures. For an add-on touch panel, a touch panel and a liquid crystal panel are produced separately, and then the touch panel is attached to the liquid crystal panel such that the latter has a touch function. The add-on touch panel is characterized by high production cost, low light transmissivity and thick module. For an on-cell touch panel, touch electrodes are disposed between a polarizer and a color film substrate of a liquid crystal panel. For an in-cell touch panel, touch electrodes are disposed inside a liquid crystal panel, and no touch panel glass is needed on the exterior, but only a protective glass layer. Therefore, due to advantages as high light transmissivity, high fitting rate, thin thickness and light weight, the in-cell touch panel will become the mainstream of the touch market in the future.

SUMMARY

In an in-cell touch panel, both driving electrodes and inducting electrodes are integrated in a display substrate, which may cause a lower signal to noise ratio (SNR) of the display substrate and adversely affect accuracy and sensitivity of the touch control. To this end, it is an object of embodiments of the present disclosure to solve or mitigate the above problems or other problems in this field. Specifically, embodiments of the present disclosure propose increasing a surface area of touch electrodes, thereby facilitating accumulation of more charges and improving sensitivity and accuracy of touch control.

In a first aspect, a display substrate is provided, comprising: a base substrate; a patterned black matrix arranged on the base substrate; and touch electrodes, wherein in a region where the black matrix is located, the display substrate comprises a filter layer stack located on the black matrix, the filter layer stack comprising two or more color filter layers stacked sequentially and a plurality of first openings provided therein; and wherein the touch electrodes are arranged on the filter layer stack and cover surfaces of the plurality of first openings.

In a capacitive touch panel, when touch electrodes are made of a nontransparent conductive material, the touch electrodes are arranged in the region where the black matrix is located, so as to avoid affecting an aperture ratio of the touch panel. Therefore, a width of the touch electrodes is limited to a dimension of a pattern of the black matrix, which may result in a small mutual capacitance between the touch electrodes. Accordingly, when the touch panel is touched, changes in the mutual capacitance between the touch electrodes are very weak such that the SNR is low, thus affecting the sensitivity and accuracy of the touch panel. Technical solutions of embodiments of the present disclosure solve the above problem effectively. According to embodiments of the present disclosure, a filter layer stack with a plurality of first openings is arranged in a region where a black matrix of the display substrate is located such that a surface area of touch electrodes covering the filter layer stack is increased, which facilitates accumulation of more charges. Consequently, mutual capacitances between the touch electrodes are larger, and when the touch panel is touched, the changes in the mutual capacitances between the touch electrodes are greater, which improves the SNR and the sensitivity and accuracy of the touch control of the touch panel.

The above technical solution of the embodiments of the present disclosure is also applicable in a case where touch electrodes are made of a transparent conductive material.

In embodiments of the present disclosure, layers in the filter layer stack and color filter layers in the display substrate are formed in a same patterning process with a same material. That is, the manufacture process of the display substrate is compatible with that of an existing display substrate, so no extra process steps need to be involved. This helps to simplify the process and control the cost.

For example, a plurality of first recesses are arranged in a surface of the black matrix facing away from the base substrate, wherein the plurality of first recesses correspond to the plurality of first openings in the filter layer stack respectively, and the touch electrodes further cover surfaces of the plurality of first recesses. By way of example, the plurality of first recesses communicate with the plurality of first openings in the filter layer stack respectively.

In embodiments of the present disclosure, the touch electrodes cover not only the surfaces of the plurality of first openings, but also the surfaces of the plurality of first recesses. This further increases the surface area of the touch electrodes, and thus further improves the sensitivity and accuracy of the touch control.

For example, a depth of the plurality of first recesses is equal to or smaller than a thickness of the black matrix.

In embodiments of the present disclosure, when the depth of the first recesses is equal to the thickness of the black matrix, the touch electrodes are made of a nontransparent conductive material such as a nontransparent metal. In this way, a light shielding function of the black matrix in positions where the first recesses are located is achieved by using the nontransparent conductive material. When the depth of the first recesses is smaller than the thickness of the black matrix, the touch electrodes are made of either a transparent conductive material or a nontransparent conductive material.

For example, the display substrate further comprises a first over-coating (OC) arranged between the base substrate and the filter layer stack. The first over-coating is provided with a plurality of second openings or recesses in a surface facing away from the base substrate wherein the plurality of second openings or recesses correspond to the plurality of first openings in the filter layer stack respectively.

In embodiments of the present disclosure, the first over-coating is provided with a plurality of second openings or recesses in a surface facing away from the base substrate, and the plurality of second openings or recesses correspond to the plurality of first openings in the filter layer stack respectively. Due to the plurality of second openings or recesses in the first over-coating, the surface area of the touch electrodes is further increased, and thus the sensitivity and accuracy of the touch control are further improved.

For example, the first over-coating is arranged between the base substrate and the black matrix.

In embodiments of the present disclosure, the first over-coating is arranged between the base substrate and the black matrix, and a plurality of second openings are arranged in an upper surface of the first over-coating, the plurality of second openings resulting in a plurality of recesses formed in the black matrix accordingly. The touch electrodes cover surfaces of the plurality of openings and the plurality of recesses in the black matrix, which further increases the surface area of the touch electrodes and thus further improves the sensitivity and accuracy of the touch control.

For example, the first over-coating is arranged between the black matrix and the filter layer stack, and the touch electrodes further cover surfaces of the plurality of second openings or recesses.

In embodiments of the present disclosure, the touch electrodes cover not only the surfaces of the plurality of first openings, but also the surfaces of the plurality of second openings or recesses, which further increases the surface area of the touch electrodes and thus further improves the sensitivity and accuracy of the touch control.

For example, a depth of the plurality of second openings is equal to a thickness of the first over-coating; the black matrix is provided with a plurality of third recesses in a surface facing away from the base substrate, wherein the plurality of third recesses correspond to the plurality of second openings respectively; and the touch electrodes further cover the surfaces of the plurality of third recesses. By way of example, the plurality of third recesses communicate with the plurality of second openings respectively.

In embodiments of the present disclosure, the touch electrodes cover the surfaces of the plurality of first openings in the filter layer stack, the surfaces of the plurality of second openings in the first over-coating and the surfaces of the plurality of third recesses in the black matrix, which further increases the surface area of the touch electrodes and thus further improves the sensitivity and accuracy of the touch control.

For example, a depth of the plurality of third recesses is equal to or smaller than a thickness of the black matrix.

In embodiments of the present disclosure, when the depth of the third recesses is equal to the thickness of the black matrix, the touch electrodes are made of a nontransparent conductive material such as a nontransparent metal. In this way, a light shielding function of the black matrix in positions where the third recesses are located is achieved by using the nontransparent conductive material. When the depth of the third recesses is smaller than the thickness of the black matrix, the touch electrodes are made of either a transparent conductive material or a nontransparent conductive material.

In embodiments of the present disclosure, the first over-coating is made of an inorganic material, or an organic material such as resin. As compared with an inorganic material such as a silicon nitride, a silicon oxide or a silicon oxynitride, a resin material is more advantageous because a resin layer can be formed by a simple coating process without a separate vapor deposition chamber which is required for formation of an inorganic material layer.

In a second aspect, the present disclosure provides a display device comprising the display substrate as mentioned above.

The display device according to embodiments of the present disclosure has same or similar benefits as the display substrate as mentioned above, which will not be repeated here for simplicity.

In a third aspect, the present disclosure provides a method for manufacturing a display substrate, comprising steps of: preparing a base substrate on which a patterned black matrix is arranged; forming a filter layer stack on the base substrate and patterning it to form a plurality of first openings; and forming on the filter layer stack touch electrodes covering surfaces of the plurality of first openings.

For example, the method further comprises: on a surface of the black matrix facing away from the base substrate, forming a plurality of first recesses corresponding to the plurality of first openings respectively. By way of example, the plurality of first recesses communicate with the plurality of first openings respectively.

For example, the method further comprises: prior to forming the filter layer stack, forming a first over-coating on the base substrate; and patterning the first over-coating to form on a surface facing away from the base substrate a plurality of second openings or recesses corresponding to the plurality of first openings respectively.

For example, forming the first over-coating further comprises: forming the first over-coating between the base substrate and the black matrix.

For example, forming the first over-coating further comprises: forming the first over-coating between the black matrix and the filter layer stack, wherein the touch electrodes further cover surfaces of the plurality of second openings or recesses.

For example, the method further comprises: on a surface of the black matrix facing away from the base substrate, forming a plurality of third recesses corresponding to the plurality of second openings respectively, wherein a depth of the plurality of second openings is equal to a thickness of the first over-coating. By way of example, the plurality of third recesses communicate with the plurality of second openings respectively.

The display substrate of embodiments of the present disclosure comprises a base substrate; a patterned black matrix arranged on the base substrate; and touch electrodes, wherein in a region where the black matrix is located, the display substrate comprises a filter layer stack located on the black matrix, the filter layer stack comprising two or more color filter layers stacked sequentially and a plurality of first openings provided therein; and wherein the touch electrodes are arranged on the filter layer stack and cover surfaces of the plurality of first openings. According to embodiments of the present disclosure, a filter layer stack with a plurality of first openings is arranged in a region where the black matrix of the display substrate is located such that a surface area of the touch electrodes covering the filter layer stack is increased, which facilitates accumulation of more charges and improves sensitivity and accuracy of the touch control.

BRIEF DESCRIPTION OF DRAWINGS

In order to explain technical solutions of embodiments of the present disclosure more clearly, the drawings of embodiments will be briefly introduced below. It should be understood that the drawings in the following description only relate to some of embodiments of the present disclosure and are not intended to limit the present disclosure.

DETAILED DESCRIPTION OF EMBODIMENTS

Figure 1:
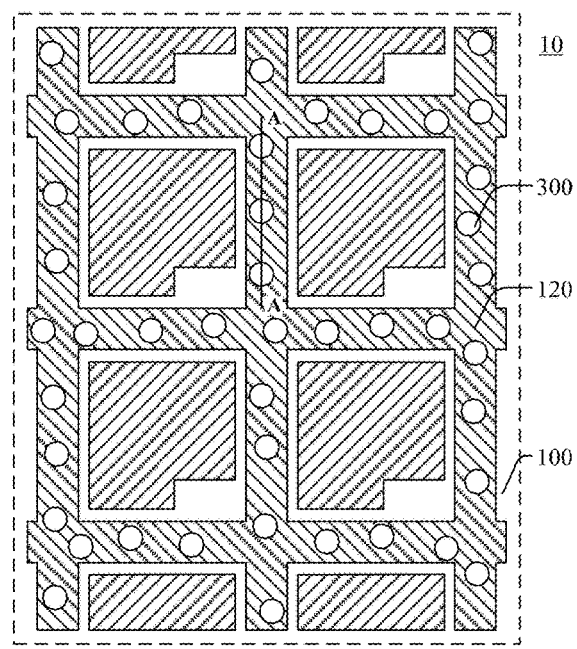
FIG. 1 is a schematic top view of a portion of a display substrate according to an embodiment of the present disclosure.

In order to help those skilled in the art better understand the technical solutions of the present disclosure, structures and principles of the present disclosure will be illustrated below in detail in connection with the drawings. The embodiments listed are only used to explain the present disclosure, and not to limit the protection scope of the present disclosure.

Components shown in the drawings are labelled as follows: 10 display substrate; 100 base substrate; 120 black matrix; 140 filter layer stack; 140a, 140b, 140c color filter layer; 160 touch electrode; 180 second over-coating; 200 spacer; 220 first over-coating; 300 first opening; 310 first recess; 320a second opening; 320b second recess; 330 third recess.

FIG. 1 is a schematic top view of a portion of a display substrate according to an embodiment of the present disclosure. FIGS. 2A, 2B, 2C, 2D and 2E are respectively schematic section views along line A-A of FIG. 1. As shown, a display substrate 10 comprises a base substrate 100 and a black matrix 120 arranged on the base substrate 100. The black matrix 120 is patterned to define a plurality of subpixel regions, each subpixel region being provided with a filter layer of a corresponding color. The display substrate 10 further comprises touch electrodes 160. The touch electrodes 160 are driving electrodes or inducting electrodes. As can be seen from FIG. 1, the line A-A falls within a region where the black matrix 120 is located.

Figure 2A:
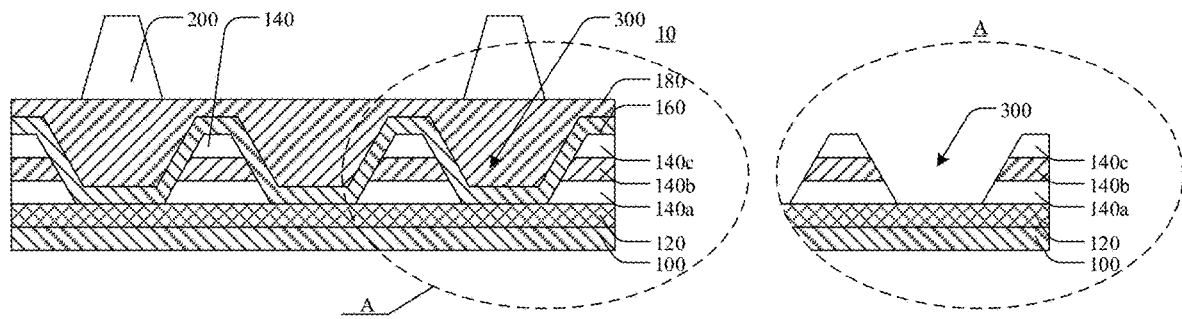
FIGS. 2A, 2B, 2C, 2D and 2E are schematic section views of a portion of a display substrate according to embodiments of the present disclosure.

FIG. 2A shows an exemplary structure of the display substrate 10. As shown in FIG. 2A, in the region where the black matrix 120 is located, the display substrate 10 comprises a filter layer stack 140 located on the black matrix 120. The filter layer stack 140 comprises two or more color filter layers stacked sequentially. For example, the filter layer stack 140 comprises a stack of three color filter layers 140a, 140b and 140c.

The display substrate 10 adopts three primary colors of red, green and blue, so the color filter layers 140a, 140b and 140c are respectively red, green and blue filter layers as shown in FIG. 2A. The display substrate 10 further adopts more primary colors such as four primary colors of red, green, blue and white, four primary colors of red, green, blue and yellow, five primary colors of red, green, blue, yellow and white, and so on. In this case, the filter layer stack 140 comprises two or more color filter layers of these primary colors. For example, the filter layer stack 140 is a four-layered stack of red, green, blue and white filter layers, a four-layered stack of red, green, blue and yellow filter layers, or a five-layered stack of red, green, blue, yellow and white filter layers. Of course, there is a case in which the filter layer stack 140 comprises only a stack of two color filter layers. For example, in a case of the three primary colors of red, green and blue, the filter layer stack 140 comprises only a stack of any two of red, green and blue color filter layers. Color filter layers in the filter layer stack 140 are stacked in an arbitrary order.

The filter layer stack 140 is provided with a plurality of first openings 300. The first openings 300 are distributed randomly in the region where the black matrix 120 is located and have any suitable shapes. The touch electrodes 160 are arranged on the filter layer stack 140 and cover surfaces of the plurality of first openings 300. Since the touch electrodes 160 cover the surfaces of the plurality of first openings 300, a surface area of the touch electrodes 160 is increased, which facilitates accumulation of more charges and thus improves sensitivity and accuracy of the touch control.

As an example, the display substrate 10 further comprises a second over-coating 180. The second over-coating 180 covers the touch electrodes 160, thereby protecting the touch electrodes 160 and providing the display substrate 10 with a planar surface.

As an example, the display substrate 10 further comprises spacers 200. The spacers 200 are arranged on the second over-coating 180. After the display substrate 10 is cell-aligned with a cell-aligned substrate, the spacers 200 maintain a cell gap between the display substrate 10 and the cell-aligned substrate.

Figure 2B:
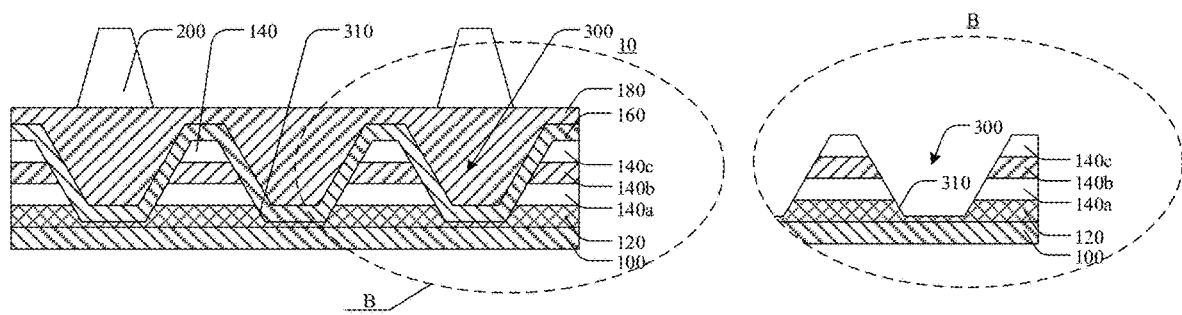

FIG. 2B shows an exemplary structure of the display substrate 10. The display substrate 10 of FIG. 2B differs from FIG. 2A in: a plurality of first recesses 310 is arranged in a surface of the black matrix 120 facing away from the base substrate 100. The plurality of first recesses 310 in the black matrix 120 correspond to the plurality of first openings 300 in the filter layer stack 140 respectively. For example, the plurality of first recesses 310 communicate with the plurality of first openings 300 in the filter layer stack 140 respectively. The touch electrodes 160 cover surfaces of the plurality of first openings 300 and the plurality of first recesses 310.

As an example, a depth of the first recesses 310 is equal to or smaller than a thickness of the black matrix 120. When the depth of the first recesses 310 is equal to the thickness of the black matrix 120, the touch electrodes 160 are made of a nontransparent conductive material such as a nontransparent metal. In this way, a light shielding function of the black matrix 120 in positions where the first recesses 310 are located is achieved by using the nontransparent conductive material. When the depth of the first recesses 310 is smaller than the thickness of the black matrix 120, the light shielding function of the black matrix 120 in positions where the first recesses 310 are located will not be affected. In this case, the touch electrodes 160 are made of either a transparent conductive material or a nontransparent conductive material.

In the case as shown in FIG. 2B, the touch electrodes 160 cover not only the surfaces of the plurality of first openings 300, but also the surfaces of the plurality of first recesses 310, which further increases the surface area of the touch electrodes 160 and thus further improves the sensitivity and accuracy of the touch control. Reference can be made to FIG. 2A for other aspects of the display substrate 10 in FIG. 2B, which will not be repeated here for simplicity.

Figure 2C:
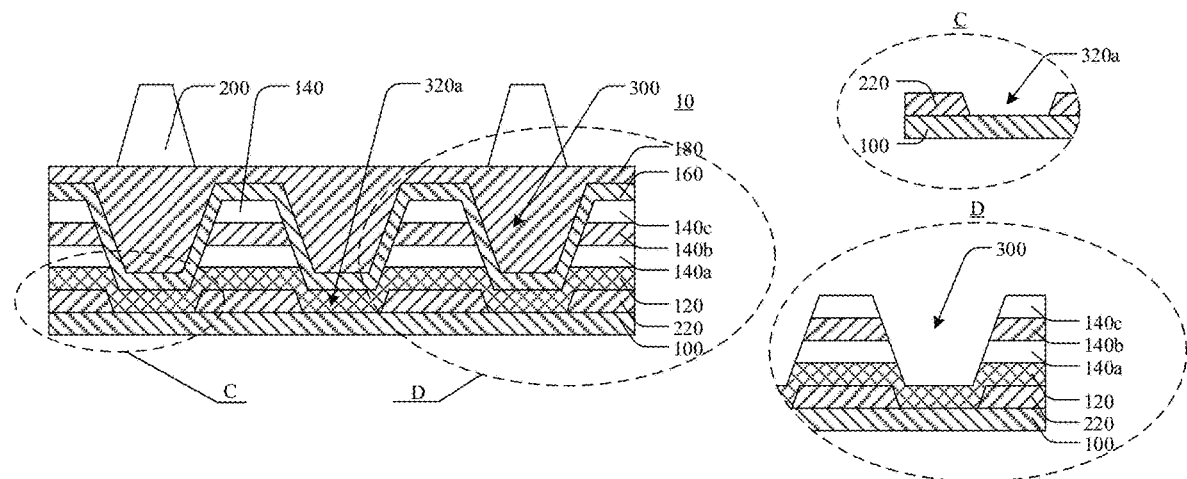
Figure 2D:
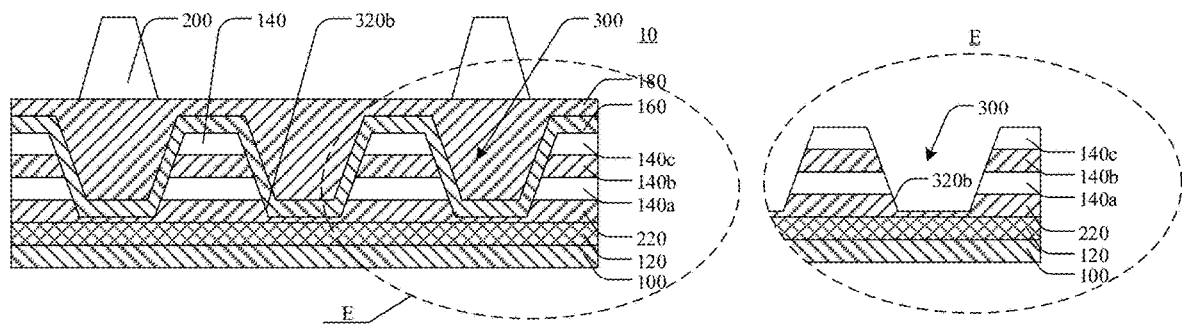
Figure 2E:
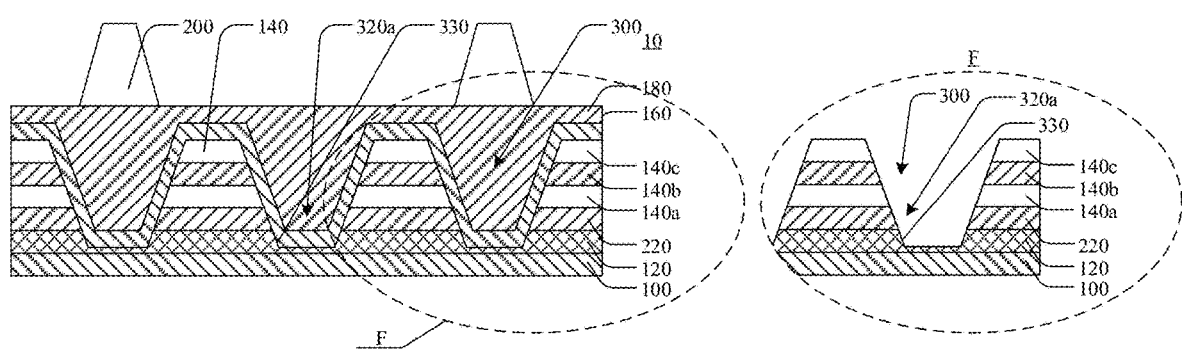

FIGS. 2C, 2D and 2E show exemplary structures of the display substrate 10. As an example, the display substrate 10 comprises a first over-coating 220 arranged between the base substrate 100 and the filter layer stack 140. A plurality of second openings 320a (FIGS. 2C and 2E) are arranged in the first over-coating 220, or a plurality of second recesses 320b (FIG. 2D) are arranged in a surface of the first over-coating 220 facing away from the base substrate 100. The plurality of second openings 320a or the plurality of second recesses 320b correspond to the plurality of first openings 300 in the filter layer stack 140 respectively.

The display substrate 10 of FIG. 2C differs from FIG. 2A in: the display substrate 10 further comprises a first over-coating 220 arranged between the base substrate 100 and the black matrix 120. A plurality of second openings 320a are arranged in the first over-coating 220. As shown, the depth of the second openings 320a is equal to the thickness of the first over-coating 220. That is, the second openings 320a penetrate the first over-coating 220.

The black matrix 120 covers the first over-coating 220 conformably. That is, in a region where the plurality of second openings are located, the black matrix 120 correspondingly forms a plurality of recesses. Since the plurality of second openings 320a in the first over-coating 220 correspond to the plurality of first openings 300 in the filter layer stack 140 respectively, the plurality of recesses in the black matrix 120 also correspond to the plurality of first openings 300 respectively. Therefore, the touch electrodes 160 cover not only the surfaces of the plurality of first openings 300 in the filter layer stack 140, but also the surfaces of the plurality of recesses in the black matrix 120.

As shown in FIG. 2C, the first over-coating 220 is arranged between the base substrate 100 and the black matrix 120, and a plurality of second openings 320a are arranged in the first over-coating 220. In this way, the touch electrodes 160 cover the surfaces of the plurality of first openings 300 and the surfaces of the plurality of recesses in the black matrix 120, which further increases the surface area of the touch electrodes 160 and thus further improves the sensitivity and accuracy of the touch control. Reference can be made to FIG. 2A for other aspects of the display substrate 10 in FIG. 2C, which will not be repeated here for simplicity.

FIG. 2D shows an exemplary structure of the display substrate 10. The display substrate 10 of FIG. 2D differs from FIG. 2C in: the first over-coating 220 is arranged between the black matrix 120 and the filter layer stack 140; and the touch electrodes 160 further cover the surfaces of the plurality of second recesses 320b.

The black matrix 120 is arranged on the base substrate 100, and the first over-coating 220 is arranged on the black matrix 120. A plurality of second recesses 320b are arranged in a surface of the first over-coating 220 facing away from the base substrate 100. As shown in FIG. 2D, the depth of the second recesses 320b is smaller than the thickness of the first over-coating 220. In other examples, the depth of the second recesses 320b is equal to the thickness of the first over-coating 220, such that the second recesses form openings penetrating the first over-coating 220. The plurality of second recesses 320b in the first over-coating 220 correspond to the plurality of first openings 300 in the filter layer stack 140 respectively. For example, the plurality of second recesses 320b communicate with the plurality of first openings 300 in the filter layer stack 140 respectively. The touch electrodes 160 cover surfaces of the plurality of first openings 300 and the plurality of second recesses 320b.

As shown in FIG. 2D, the touch electrodes 160 cover not only the surfaces of the plurality of first openings 300, but also the surfaces of the plurality of second recesses 320b, which further increases the surface area of the touch electrodes 160 and thus further improves the sensitivity and accuracy of the touch control. Reference can be made to FIG. 2C for other aspects of the display substrate 10 in FIG. 2D, which will not be repeated here for simplicity.

FIG. 2E shows an exemplary structure of the display substrate 10. The display substrate 10 of FIG. 2E differs from FIG. 2D in: the plurality of second openings 320a are formed in the first over-coating 220, and the depth of the plurality of second openings 320a in the first over-coating 120 is equal to the thickness of the first over-coating 220; and a plurality of third recesses 330 are arranged in a surface of the black matrix 120 facing away from the base substrate 100, wherein the plurality of third recesses 330 communicate with the plurality of second openings 320a in the first over-coating 120 respectively, and the touch electrodes 160 further cover the surfaces of the plurality of third recesses 330.

Similar to the case of the first recesses 310 as shown in FIG. 2B, the depth of the third recesses 330 in the black matrix 120 is equal to or smaller than the thickness of the black matrix 120. When the depth of the third recesses 330 is equal to the thickness of the black matrix 120, the third recesses forms openings penetrating the black matrix 120, and the touch electrodes 160 are made of a nontransparent conductive material to achieve a light shielding function. When the depth of the third recesses 330 is smaller than the thickness of the black matrix 120, the touch electrodes 160 are made of either a transparent conductive material or a nontransparent conductive material.

As shown in FIG. 2E, the touch electrodes 160 cover the surfaces of the plurality of first openings 300 in the filter layer stack 140, the surfaces of the plurality of second openings 320a in the first over-coating 220 and the surfaces of the plurality of third recesses 330 in the black matrix 120, which further increases the surface area of the touch electrodes 160 and thus further improves the sensitivity and accuracy of the touch control. Reference is made to FIG. 2D for other aspects of the display substrate 10 in FIG. 2E, which will not be repeated here for simplicity.

The display substrate 10 as described above is any one of a color film substrate, an array substrate and a color filter on array (COA) substrate. When the display substrate 10 is a color film substrate or a COA substrate, the technical solutions of embodiments of the present disclosure are advantageous because the filter layer stack arranged in a region where the black matrix is located is formed with a color filter layer in the color filter substrate or the COA substrate at the same time. In this case, the display substrate 10 is formed in an existing display substrate manufacturing process without involving extra process steps.

Embodiments of the present disclosure further provide a display device comprising the above display substrate. The display device may be any product or component having a display function, such as a handset, a tablet computer, a television, a display, a notebook computer, a digital photo frame, a navigator, electronic paper and so on. The display device has the same or similar technical effects as the above display substrate, which will not be repeated here for simplicity.

Figure 3:
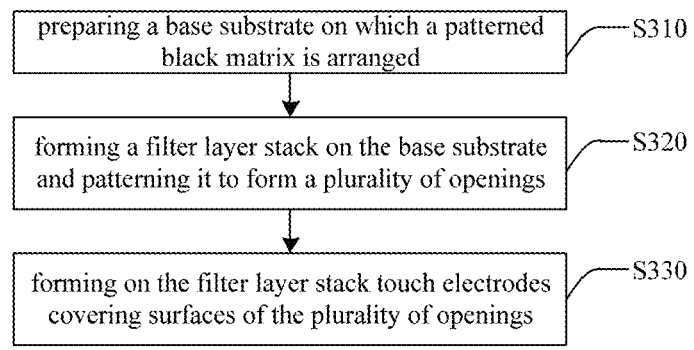
FIG. 3 is a schematic flow diagram of a method for manufacturing a display substrate according to an embodiment of the present disclosure.

FIG. 3 is a schematic flow diagram of a method for manufacturing a display substrate according to an embodiment of the present disclosure.

As shown in FIG. 3, the method comprises:

Step S310, preparing a base substrate on which a patterned black matrix is arranged;

Step S320, forming a filter layer stack on the base substrate and patterning it to form a plurality of first openings; and Step S330, forming on the filter layer stack touch electrodes covering surfaces of the plurality of first openings.

For example, step S310 further comprises: on a surface of the black matrix facing away from the base substrate, forming a plurality of first recesses corresponding to the plurality of first openings respectively. By way of example, the plurality of recesses communicate with the plurality of first openings respectively.

For example, the method further comprises:

prior to forming the filter layer stack, forming a first over-coating on the base substrate; and patterning the first over-coating to form a plurality of second openings in the first over-coating, or on a surface facing away from the base substrate a plurality of second recesses, corresponding to the plurality of first openings respectively.

For example, forming the first over-coating further comprises:

forming the first over-coating between the base substrate and the black matrix.

For example, forming the first over-coating further comprises:

forming the first over-coating between the black matrix and the filter layer stack, wherein the touch electrodes further cover the surfaces of the plurality of second openings or recesses.

For example, step S310 further comprises:

on a surface of the black matrix facing away from the base substrate, forming a plurality of third recesses corresponding to the second recesses respectively, wherein a depth of the plurality of second recesses is equal to a thickness of the first over-coating. By way of example, the plurality of third recesses communicate with the plurality of second recesses respectively.

Next, manufacture steps of a display substrate according to an embodiment of the present disclosure are described with reference to FIGS. 4A, 4B, 4C, 4D, 4E, 4F, 4G and 4H. Similarly, FIGS. 4A, 4B, 4C, 4D, 4E, 4F, 4G and 4H are respectively schematic section views along line A-A of FIG. 1.

Figure 4A:
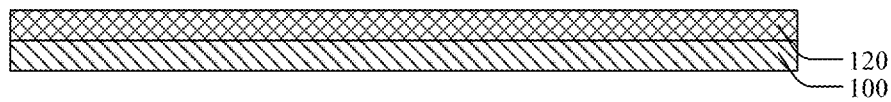
FIGS. 4A, 4B, 4C, 4D, 4E, 4F, 4G and 4H are schematic section views of a display substrate according to an embodiment of the present disclosure in each manufacture step.

As shown in FIG. 4A, a black matrix material layer is formed on a base substrate 100 through spin coating or blade coating, and a patterned black matrix 120 is obtained through a patterning process such as lithography using a mask plate. For example, the black matrix 120 has a thickness of 1-5 μm. In other examples, the black matrix material layer is formed by vacuum deposition or the like.

Figure 4B:
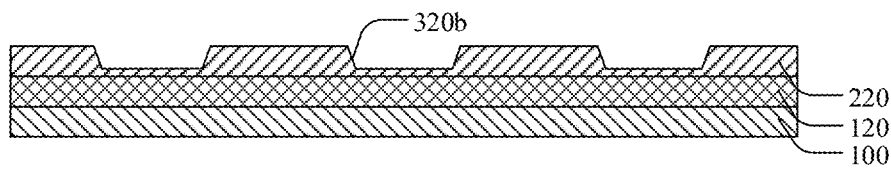

As shown in FIG. 4B, a first over-coating 220 is formed on the base substrate 100, and a patterning process such as lithography is performed on the first over-coating 220 by using a half tone mask, thereby forming a plurality of second recesses 320b in a surface of the first over-coating 220 facing away from the base substrate 100.

Figure 4C:
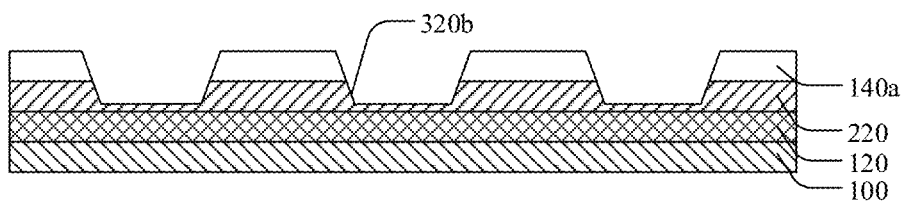

As shown in FIG. 4C, a red filter material layer is formed on the base substrate 100, and a red filter layer 140a is formed through a patterning process such as lithography. The red filter layer 140a has openings corresponding to the second recesses 320b. By way of example, the openings in the red filter layer 140a communicate with the second recesses 320b.

Figure 4D:
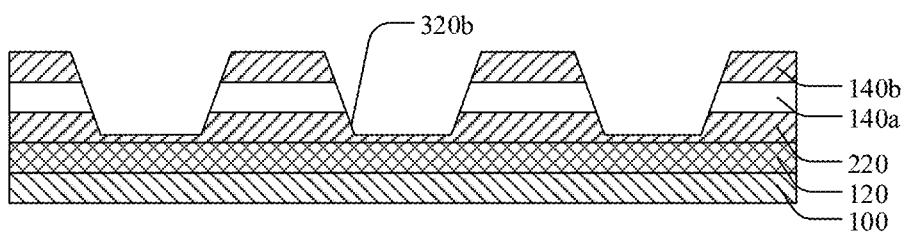

As shown in FIG. 4D, a green filter material layer is formed on the base substrate 100, and a green filter layer 140b is formed through a patterning process such as lithography. The green filter layer 140b has openings corresponding to the openings in the red filter layer 140a. By way of example, the openings in the green filter layer 140b communicate with the openings in the red filter layer 140a.

Figure 4E:
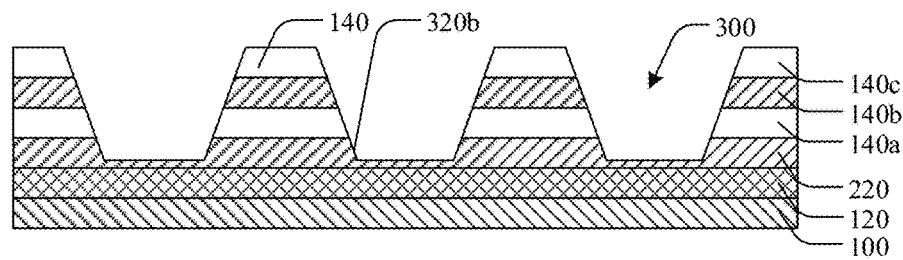

As shown in FIG. 4E, a blue filter material layer is formed on the base substrate 100, and a blue filter layer 140c is formed through a patterning process such as lithography. The blue filter layer 140c has openings corresponding to the openings in the green filter layer 140b. By way of example, the openings in the blue filter layer 140c communicate with the openings in the green filter layer 140b. Accordingly, a filter layer stack 140 comprising the red filter layer 140a, the green filter layer 140b and the blue filter layer 140c is formed. In the filter layer stack 140 a plurality of first openings 300 are formed. Each first opening 300 corresponds to, for example, corresponding second recess 320b in the first over-coating 220.

Figure 4F:
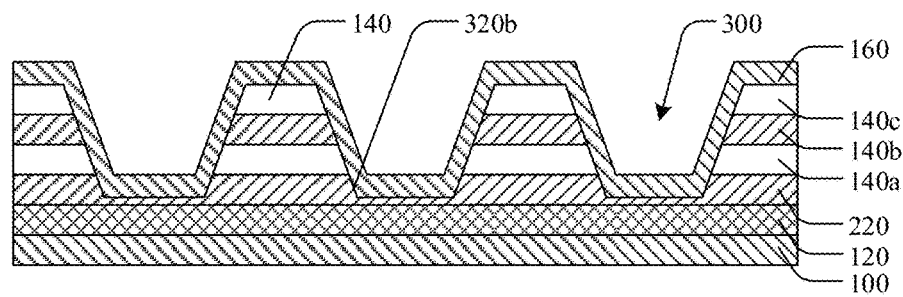

As shown in FIG. 4F, a conductive material layer is formed on the base substrate 100, and touch electrodes 160 are formed through a patterning process such as lithography. The touch electrodes 160 are arranged on the filter layer stack 140 and cover surfaces of the plurality of first openings 300 and surfaces of the plurality of second recesses 320b.

Figure 4G:
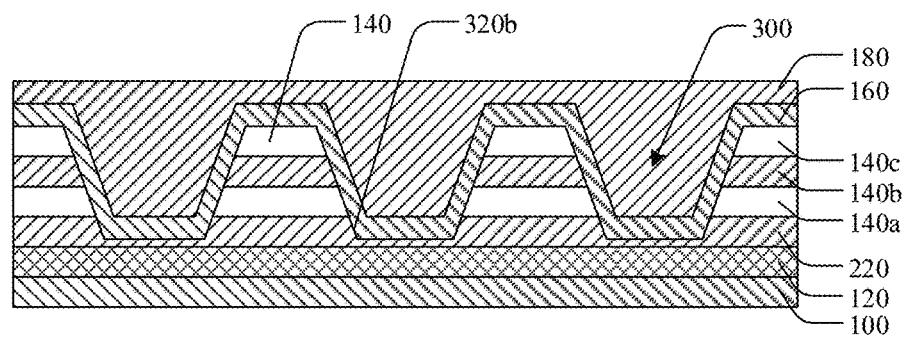

As shown in FIG. 4G, a second over-coating 180 is formed on the base substrate 100. The second over-coating 180 covers the touch electrodes 160, thereby protecting the touch electrodes 160 and providing the display substrate 10 with a planar surface.

Figure 4H:
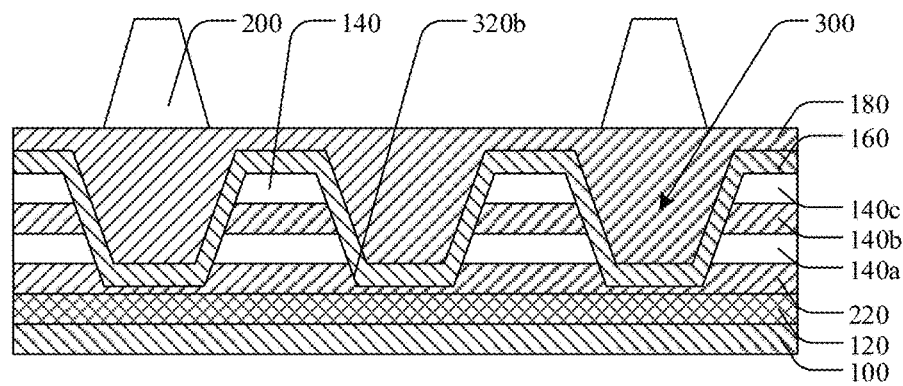

As shown in FIG. 4H, spacers 200 are formed on the base substrate 100. The spacers 200 are arranged on the second over-coating 180 and used for maintaining a cell gap between the display substrate and a cell-aligned substrate. Thereby, Manufacture of the display substrate is accomplished.

It should be noted that the display substrate as shown in FIG. 4H corresponds to the display substrate 10 as shown in FIG. 2D. That is, the specific manufacture process of the display substrate 10 as shown in FIG. 2D is described above in detail in connection with FIGS. 4A-4H. Based on the above disclosure, the implementation of the process for the display substrate 10 as shown in FIGS. 2A, 2B, 2C and 2E is known to those skilled in the art.

It should be noted that in the context of the description, a depth of an opening is equal to a thickness of a basal body in which the opening is located. For example, when the filter layer stack is provided with a plurality of first openings, each first opening penetrates the filter layer stack. A depth of a recess is equal to or smaller than a thickness of a basal body in which the recess is located, unless otherwise specified explicitly. For example, when the black matrix and the first over-coating are provided with a plurality of recesses, each recess penetrates or does not penetrate the black matrix and the first over-coating. Also, communication refers to being substantially aligned in a direction perpendicular to the base substrate and communicating with each other. For example, when the plurality of recesses in the black matrix communicate with the plurality of first openings in the filter layer stack, each recess is substantially aligned with a corresponding first opening in a direction perpendicular to the base substrate and communicates therewith, and thereby a longitudinal dimension of the first opening is increased. Shapes and sizes of the first openings, the first recesses, the second openings, the second recesses and the third recesses can be designed on demands.

It should be noted that, sizes of the layers and the regions may be exaggerated in the drawings for clarity. It can be also understood that when an element or a layer is depicted as being located "over" another element or layer, it can be disposed over the other element or layer directly, or with an intermediate layer. Also, it can be understood that when an element or a layer is depicted as being located "below" another element or layer, it can be disposed below the other element or layer directly, or with more than one intermediate layers or elements. In addition, it can also be understood that when a layer or an element is depicted as being located "between" two layers or two elements, it can be the only one layer between the two layers or two elements, or more than one intermediate layers or elements between them. Throughout the description, like reference signs indicate like elements. In the present disclosure, terms of "first", "second" and "third" are only used for descriptive purposes and should not be construed as indicating or implying relative importance.

The above descriptions of embodiments of the present disclosure are only provided for illustrative and explanation purposes. They are not intended to be exhaustive or limit the present disclosure. Therefore, those skilled in the art can easily conceive of various modifications and variations all of which fall within the protection scopes of the present disclosure. In short, the protection scopes of the present disclosure are defined by the appended claims.

The invention claimed is:

1. A display substrate, comprising: a base substrate; a black matrix which is patterned; and touch electrodes, wherein
in a region where the black matrix is located, the display substrate comprises a filter layer stack located over the black matrix and under the touch electrodes, the filter layer stack comprising two or more color filter layers stacked sequentially and a plurality of openings provided therein; and
the touch electrodes are arranged on the filter layer stack and cover surfaces of the plurality of openings in the filter layer stack;
wherein the display substrate further comprises a first over-coating, the first over-coating and the black matrix form a stack with one on the top of the other, and the stack is arranged between the base substrate and the filter layer stack;
the first over-coating has a plurality of openings, and wherein the plurality of openings in the first over-coating correspond to the plurality of openings in the filter layer stack respectively.

2. The display substrate according to claim 1, wherein a plurality of recesses are arranged in a surface of the black matrix facing away from the base substrate, and wherein the plurality of recesses correspond to the plurality of openings in the filter layer stack respectively; and
the touch electrodes further cover surfaces of the plurality of recesses.

3. The display substrate according to claim 2, wherein a depth of the plurality of recesses is smaller than a thickness of the black matrix.

4. The display substrate according to claim 1, wherein the first over-coating is arranged between the base substrate and the black matrix.

5. The display substrate according to claim 1, wherein the first over-coating is arranged between the black matrix and the filter layer stack; and
the touch electrodes further cover surfaces of the plurality of openings in the first over-coating.

6. A display device, comprising the display substrate according to claim 1.

7. The display device according to claim 6, wherein a plurality of recesses are arranged in a surface of the black matrix facing away from the base substrate, and wherein the plurality of recesses correspond to the plurality of openings in the filter layer stack respectively; and
the touch electrodes further cover surfaces of the plurality of recesses.

8. The display device according to claim 7, wherein a depth of the plurality of recesses is smaller than a thickness of the black matrix.

9. The display device according to claim 6, wherein the first over-coating is arranged between the base substrate and the black matrix.

10. The display device according to claim 6, wherein the first over-coating is arranged between the black matrix and the filter layer stack; and
the touch electrodes further cover surfaces of the plurality of openings in the first over-coating.

11. The display substrate according to claim 1, wherein projections of touch electrodes on the base substrate are within projections of the black matrix on the base substrate.

12. The display device according to claim 6, wherein projections of touch electrodes on the base substrate are within projections of the black matrix on the base substrate.

13. A method for manufacturing a display substrate, comprising steps of:
preparing a base substrate;
forming a stack of a black matrix and a first over-coating on the base substrate, such that the black matrix and the first over-coating are arranged one on top of there other, wherein the black matrix is patterned;
patterning the first over-coating to form a plurality of openings in the first over-coating;
forming a filter layer stack on the stack of the black matrix and the first over-coating and patterning it to form a plurality of openings corresponding to the plurality of openings in the first over-coating.

14. The method according to claim 13, further comprising:
in a surface of the black matrix facing away from the base substrate, forming a plurality of recesses corresponding to the plurality of openings in the filter layer stack respectively.

15. The method according to claim 13, wherein forming the stack of the black matrix and the first over-coating further comprises:
forming the first over-coating on the base substrate;
forming the black matrix on the first over-coating.

16. The method according to claim 13, wherein forming the stack of the black matrix and the first over-coating further comprises:
forming the black matrix on the base substrate;
forming the first over-coating on the black matrix,
wherein the touch electrodes further cover surfaces of the plurality of openings in the first over-coating.

17. The method according to claim 13, wherein projections of touch electrodes on the base substrate are within projections of the black matrix on the base substrate.

* * * * *